United States Patent

Snare et al.

[11] Patent Number: 5,947,217
[45] Date of Patent: Sep. 7, 1999

[54] TRACK LAYING VEHICLE

[76] Inventors: Kerry M. Snare, 8291 Opal Dr.;
Christian Kuchling, 6130 A Blackberry
St., both of Anchorage, Ak. 99502

[21] Appl. No.: 08/754,555

[22] Filed: Nov. 21, 1996

Related U.S. Application Data

[63] Continuation-in-part of application No. 08/625,864, Apr. 1, 1996.

[51] Int. Cl.$^6$ .................................................. B62D 55/108
[52] U.S. Cl. ....................... 180/9.56; 180/9.54; 305/127; 305/128
[58] Field of Search ..................................... 180/9.1, 9.48, 180/9.5, 9.54, 9.56, 192, 193; 305/121, 128, 130, 131, 127, 116, 20, 120, 134, 153, 154

[56] References Cited

U.S. PATENT DOCUMENTS

| | | |
|---|---|---|
| 3,183,016 | 5/1965 | Gustafsson . |
| 3,447,621 | 6/1969 | Schoonover . |
| 3,477,339 | 11/1969 | Lundin et al. . |
| 3,744,583 | 7/1973 | Bedard ..................................... 305/24 |
| 3,879,092 | 4/1975 | Rose .......................................... 305/24 |
| 3,933,214 | 1/1976 | Guibord et al. .......................... 305/24 |
| 5,014,805 | 5/1991 | Uchida .................................... 180/184 |

*Primary Examiner*—Anne Marie Boehler
*Attorney, Agent, or Firm*—Michael J. Tavella

[57] ABSTRACT

A track vehicle that uses a sliding rail type suspension, which is mounted on the outside of the vehicle frame. A supporting frame is used to support the outer edge of the track. The use of this type of suspension allows the vehicle to operate at speeds in excess of 50 miles per hour. A support shaft attaches to the track suspension arm. The support shaft is secured to the vehicle using a pair of spaced apart bearings. These bearings restrain the shaft, and thus the track from a deflectional force that causes the track to splay outwards. The shaft and bearings prevent this splaying action, thus permitting the vehicle to operate at high speeds.

7 Claims, 6 Drawing Sheets

TRACK LAYING VEHICLE

RELATED APPLICATION INFORMATION

This application is a continuation in part of application Ser. No. 08/625,864 filed Apr. 1, 1996, now copending.

This invention relates to track laying vehicles and particularly to track laying vehicles having externally mounted sliding rail type suspension systems.

BACKGROUND OF THE INVENTION

Track drives have been used for years in many types of vehicles. Battle tanks, bulldozers and snow machines all use some type of track drive. One type of vehicle typically known as a "snow cat" is a medium sized vehicle used during winter conditions. These vehicles have track drive and are designed to travel on snow. The suspension systems found on these vehicles limits the speed to about 18 miles per hour. So, although these vehicles are useful, they are slow. Examples of such track vehicles are found in U.S. Pat. Nos. 1,368,652 to Pennington et al., 1,329,316 to Wickersham, and 3,148,743 to Jarvi et al.

One type of snow vehicle that can attain high speeds is the snowmobile or snow machine. These vehicles use single or multiple tracks, each mounted inside a frame or "tunnel". The track uses a sliding rail type suspension system (sometimes called a skid type suspension) that allows these vehicles to operate at speeds of 50 to 80 miles per hour or more. Examples of this type of suspension system are found in U.S. Pat. Nos. 3,701,394 to Hendrickson, 3,744,583 to Bedard and 4,222,453 to Fixsen et al. Common to all these suspension systems is that each track is supported on both of its sides by the frame or tunnel. None of these systems can be used on a two track vehicle that has each track mounted on the outside of the vehicle, as there is no frame or tunnel to support the outboard mounting of the suspension system. As a result, track vehicles have used a different type of suspension that limits the speed and even the functionality of the vehicle.

The original design of this invention is a track vehicle that uses a sliding rail type suspension, which is mounted on the outside of the vehicle frame. A supporting frame member, which is attached to the outside of both tracks, is used to support the outer edge of the tracks. The use of the sliding rail type of suspension allows the vehicle to operate at high speeds. The use of a cross member support allows the sliding rail suspension to be used on the outside of the frame. A special brace member passes through each track and attaches to the outer edge of the track suspension. This member braces the tracks and allows them to operate as if they were mounted between frame members, as in a snow machine. The bracing member is lightweight and is designed to enable easy and fast track removal.

SUMMARY OF THE INVENTION

The present invention expands on the concepts discussed above. The invention uses the same idea-supporting the outside of a track, but it does away with the need for a cross brace that runs through the frame. Although the cross brace design in the original application can be used, the new design provides the same support without having to run a member through the frame of the vehicle.

The key is to provide a horizontal support member that is held in place at two bearing points. These points can be set at a number of positions about the frame of the vehicle. In one example, a shaft connects the sliding rail members to the frame of the vehicle. This shaft is supported by two bearings, mounted on the inside of the vehicle frame. This arrangement is used on both sides of the vehicle, with a set of bearings being used for each track.

Of course, despite the number of permutations, only a few positions produce superior results.

It is an object of this invention to provide a multiple-track vehicle that can operate at high speeds.

It is another object of this invention to provide a multiple-track vehicle using a sliding rail type suspension for a track mounted to the outside of the vehicle frame.

It is yet another object of this invention to produce a multiple-track vehicle that uses integral frame members that do not traverse the width of the vehicle to provide outer track support.

It is yet another object of this invention to produce a multiple-track vehicle that uses a pair of bearings to support track supporting members for each side of the track vehicle.

DETAILED DESCRIPTION OF THE INVENTION

Figure 1:
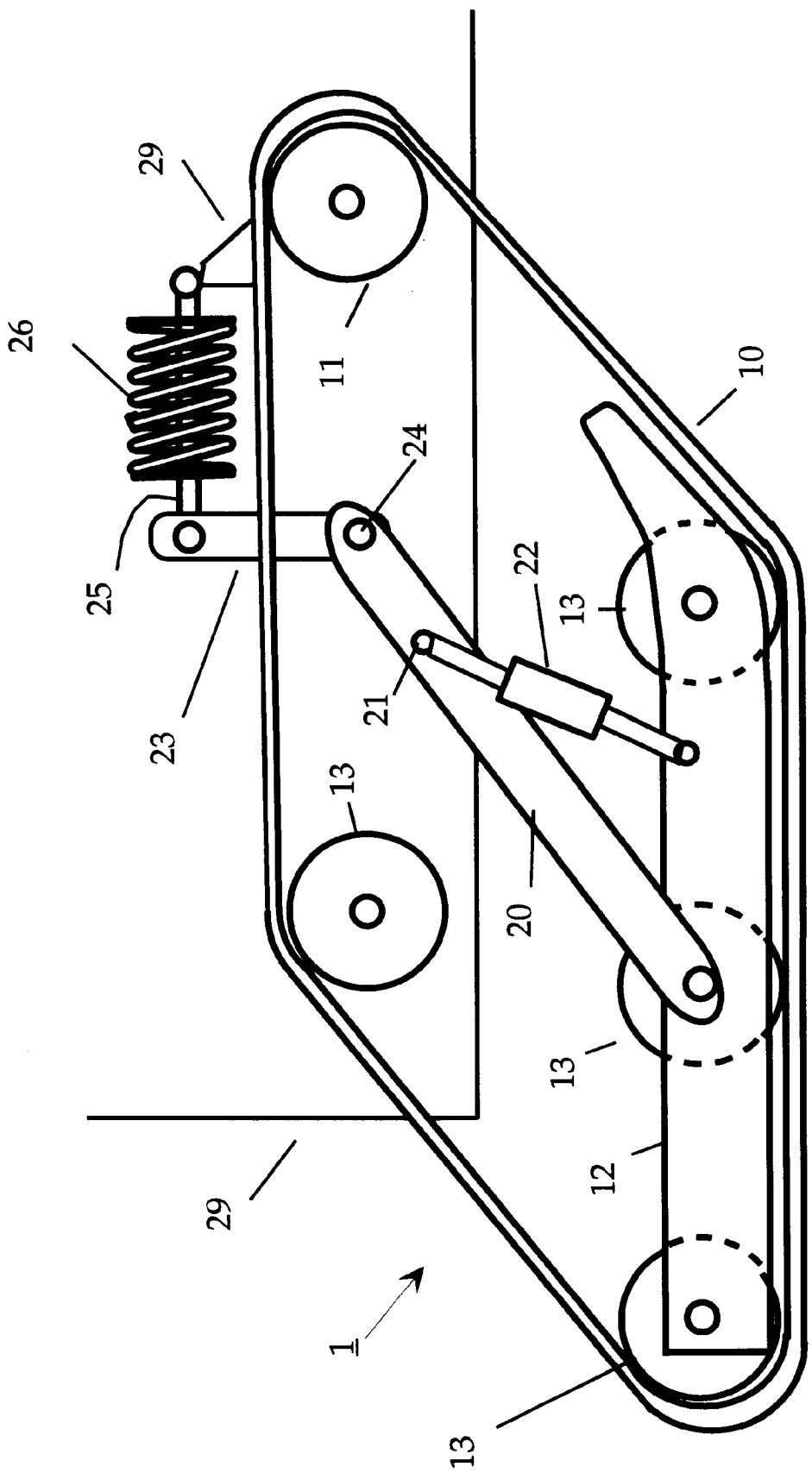
FIG. 1 is a side detail schematic view of a track and supports using the new invention.

Referring now to FIG. 1, a schematic view of a typical track and drive system 1 is shown. FIG. 1 shows the complete track drive system 1. This system has a track 10, a drive wheel 11, sliding rails 12, and idler wheels 13. The combination of the drive wheel 11 and the idler wheels 13 can be considered as a set of drive wheels. There is a set of drive wheels for each track 10. These components are typical of a sliding rail suspension system found on many snow machines, for example.

Figure 2:
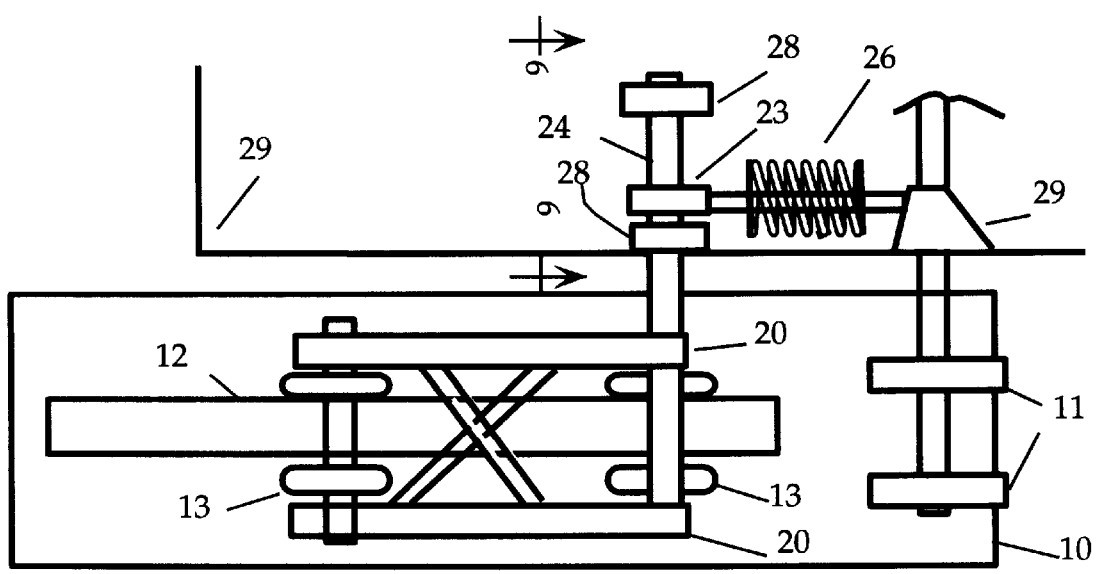
FIG. 2 is a top plan schematic view of the invention mounted on a typical sliding rail frame.

To keep the track system 1 from being deflected upwards, a support arm system is used. In the embodiment of FIGS. 1 and 2, this system has a pair of travel arms 20 that attach to the sliding rail 12. These arms are connected to a shaft 24 as shown. A point 21 on the travel arms 20 connects to a shock absorber 22. A pivoting upper arm 23 is attached to the shaft 24 as shown. Shaft 25 connects the upper arm 23 to a spring 26, that connects to the frame 29.

Figure 6:
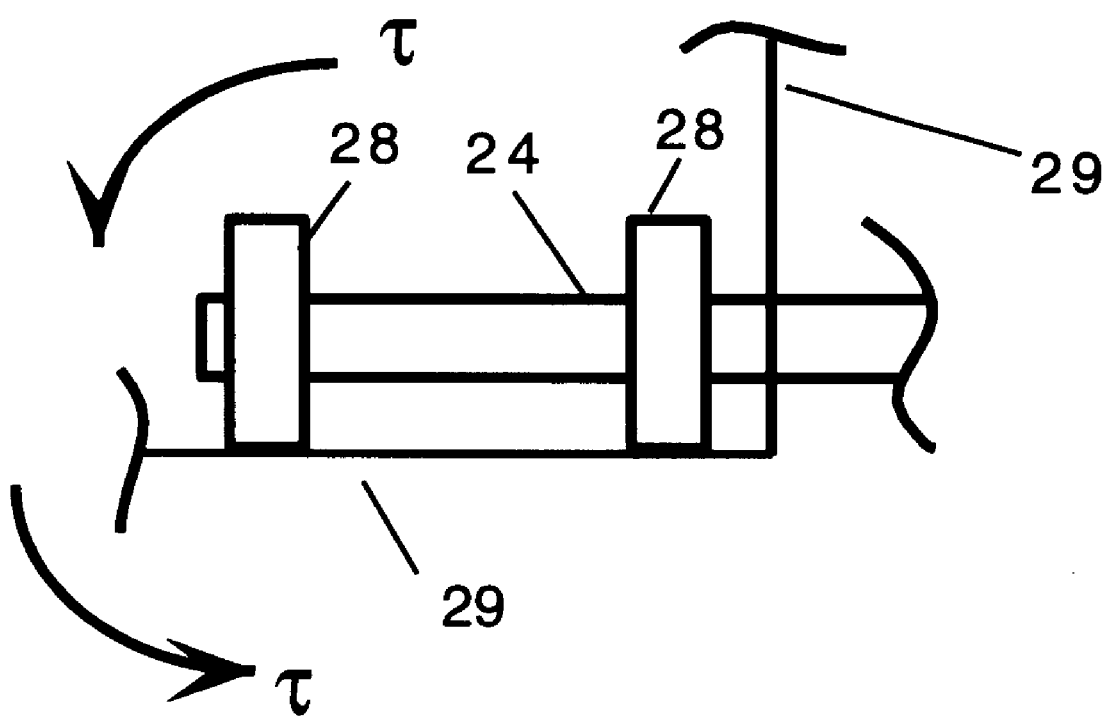
FIG. 6 is a representational view of a shaft showing the two supporting bearings and the deflectional moment force.

The key to this invention is shaft 24 and the placement of 2 bearings 28 on the shaft 24, on the same side of the track support system 1. In this embodiment, shaft 24 carries a deflectional force that we call the splaying force. Shaft 24 has a tendency to deflect in the direction of the arrows in FIG. 6. This deflectional force creates a moment τ as shown in FIG. 6. To overcome this moment force in the original design, a member was passed through the frame of the vehicle to the outer sides of both tracks 10. By attaching this member to both tracks, the moment force τ is kept in check. Although the member used in the previous design works, our new design is more effective because the member need not pass through the vehicle.

To balance the moment force τ in this design, two bearings 28 are positioned as shown on shaft 24. The bearings 28 hold shaft 24 in proper alignment and restrain the deflectional movement of the shaft 24.

The remaining embodiments show variations on the placement of the bearings and the configuration of suspension components. Use of multiple arms, or repositioning the arms can be used to create different suspension systems, however, these embodiments all have a shaft or shafts that are anchored with bearings on the same side of the suspension assembly. As in the case of the first embodiment, these alternative configurations prevent the deflectional moment force τ from deflecting the shaft or shafts 24, which causes splaying of the track 10.

We now discuss details of the second embodiment.

Figure 3:
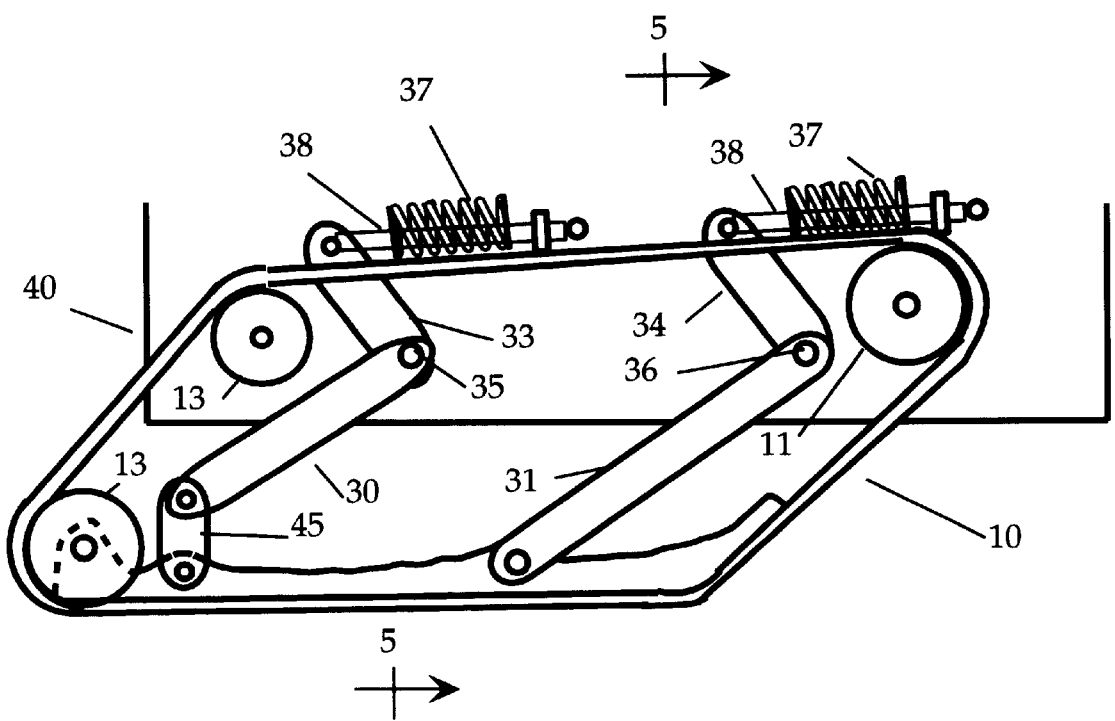
FIG. 3 is a side detail schematic view of a second embodiment of our new support using the new invention.
Figure 4:
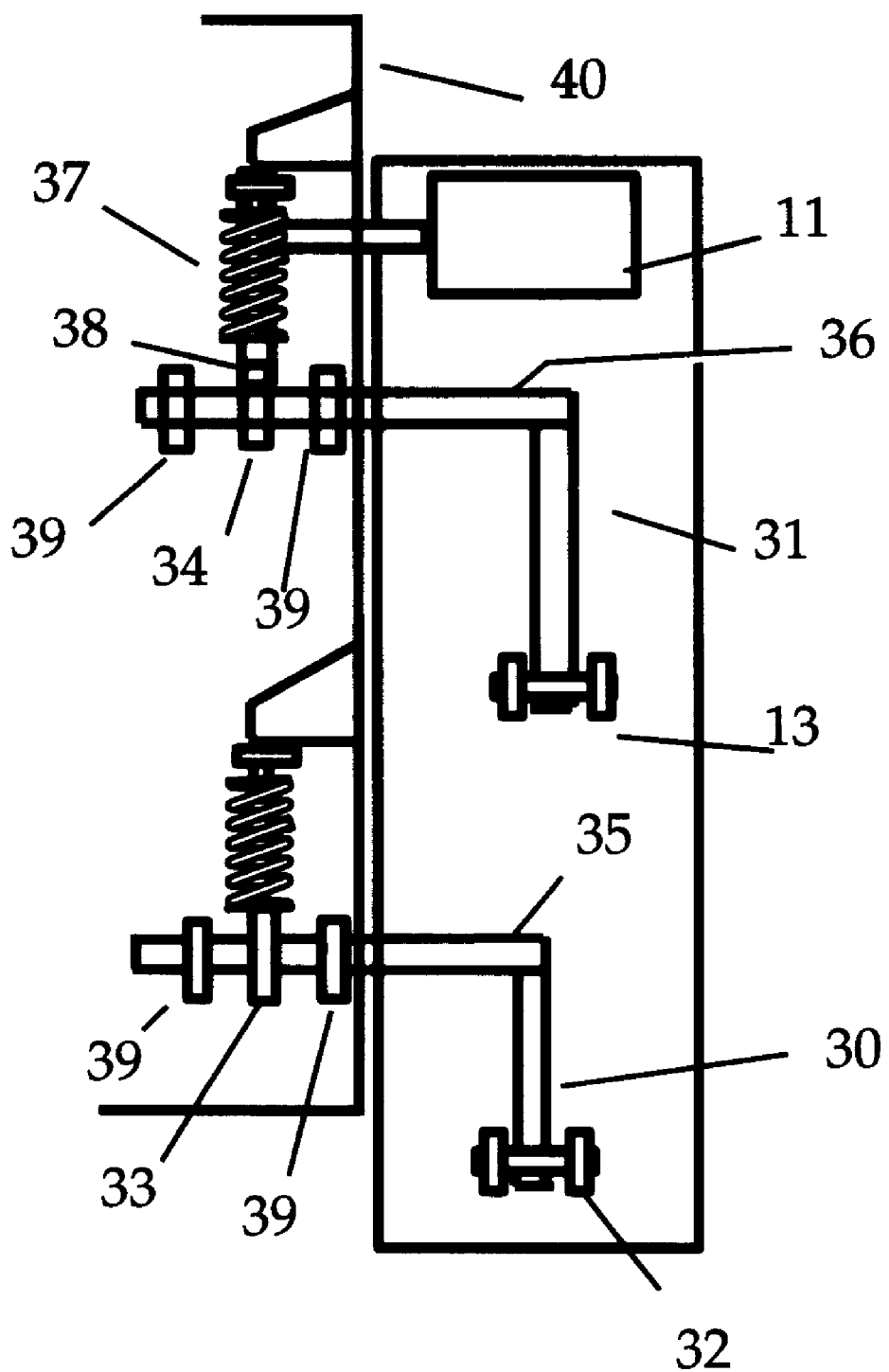
FIG. 4 is a top plan schematic view of the second embodiment of the invention mounted on a typical sliding rail frame.
Figure 5:
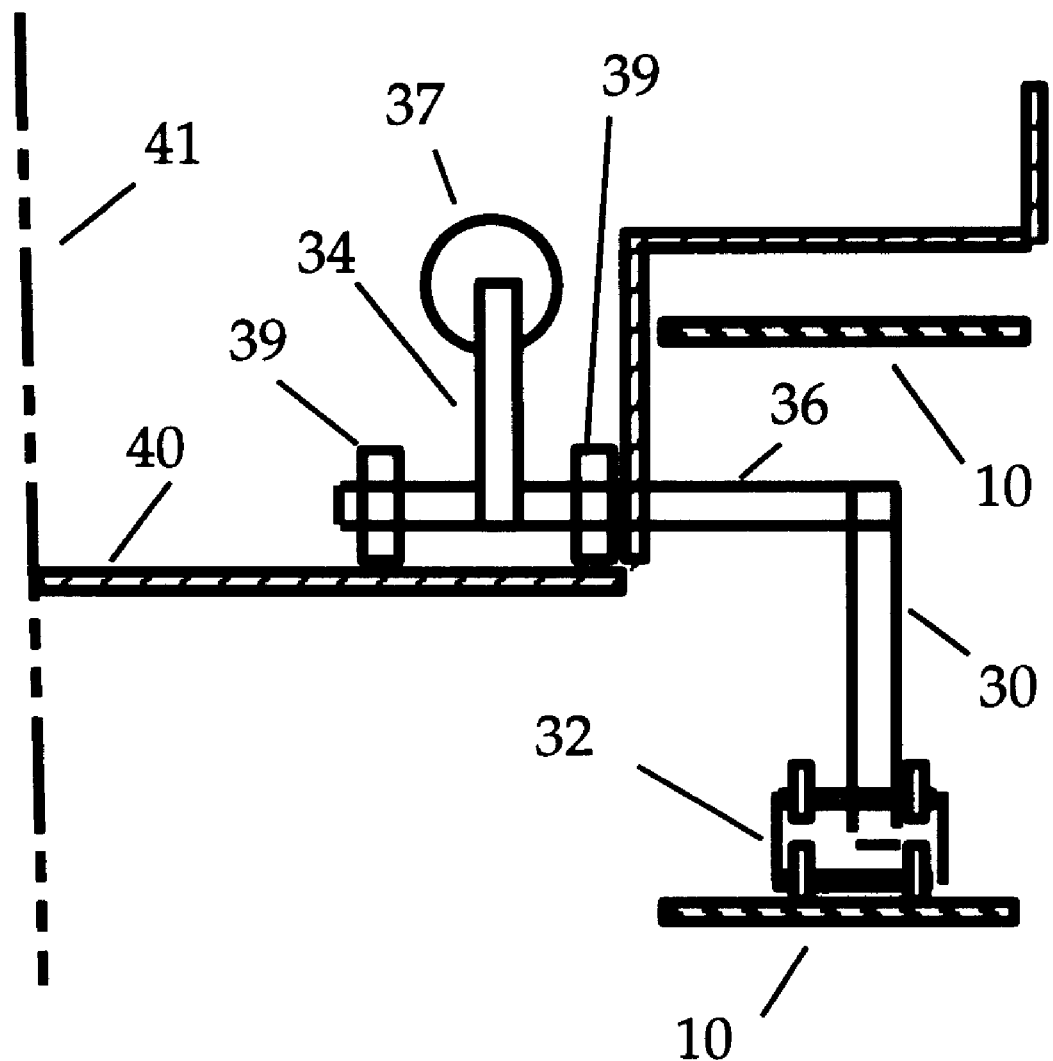
FIG. 5 is a rear elevation view of the second embodiment taken along the lines 5—5 of FIG. 3.

Referring now to FIGS. 3–5, a second embodiment of our design is shown. In this embodiment, two suspension arms 30 and 31 are used. Arm 30 has a lower pivot member 32, 45 that gives arm 30 a larger range of motion than arm 31. Upper support members 33 and 34 transmit the loads to shafts 35 and 36. Shafts 35 and 36 are the shafts that carry the splaying load, as discussed above. See also FIG. 4. As before, springs 37 are attached to the shafts 38 as shown. Shafts 38 are attached to the shafts 35 and 36 in the same manner as discussed above. Bearings 39 are attached to the shafts 35 and 36. Bearings 39 handle the moment force τ, as discussed above. FIG. 5 shows that the bearings 39 are positioned inside the frame 40. The bearings 39 can be placed anywhere along the shaft 35 or 36, but unlike the original design, the bearing placement does not have to go past the center line of the vehicle 41. In fact, it is preferred if the bearings 39 do not go past the center line 41 of the vehicle.

Clearly then, placement of the bearings on the horizontal shaft is not critical as long as there is sufficient spacing to support the load (i.e., placing the bearings too closely together negates the moment carrying capability of the bearings). Moreover, the number of arms (and accompanying shafts) used to carry this load is not critical, except as to cost and manufacturing concerns. As discussed above, once the moment force τ is restrained, the tracks can be operated at high speeds without fear of track failure, thereby expanding the scope of the vehicle that use such tracks.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A track laying vehicle comprising:
   a) a frame, having a first side and a second side;
   b) a first set of drive wheels, operably connected to the first side of said frame;
   c) a second set of drive wheels, operably connected to the second side of said frame;
   d) a first endless track, being rotatably attached to said first set of drive wheels;
   e) a second endless track, being rotatably attached to said second set of drive wheels, said first endless track and second endless track being oppositely disposed about said frame;
   f) a first sliding rail suspension system, operably installed in said first endless track, said first sliding rail suspension system having an outside portion and an inside portion, such that the inside portion is positioned in close proximity to said frame;
   g) a second sliding rail suspension system, operably installed in said second endless track, said second sliding rail suspension system having an outside portion and an inside portion, such that the inside portion is positioned in close proximity to said frame;
   h) a means for connecting said first sliding rail suspension system to said frame, whereby said means for connecting said first sliding rail suspension system includes a means for transferring a deflectional force from said first sliding rail suspension system to said frame; and
   i) a means for connecting said second sliding rail suspension system to said frame, whereby said means for connecting said second sliding rail suspension system includes a means for transferring a deflectional force from said second sliding rail suspension system to said frame;
   j) whereby said means for connecting said first sliding rail suspension system to said frame and means for connecting said second sliding rail suspension system to said frame each have a proximate end and a distal end, and further wherein only the proximate ends of said first and second means for connecting are attached to said frame.

2. The track laying vehicle of claim 1 wherein said means for connecting said first sliding rail suspension system to said frame comprises a shaft.

3. The track laying vehicle of claim 1 wherein said means for connecting said second sliding rail suspension system to said frame comprises a shaft.

4. The track laying vehicle of claim 2 wherein the means for transferring a deflectional force from said first sliding rail suspension system to said frame includes a set of bearings, attached to said shaft and being spaced apart thereon, said set of bearings also being attached to said frame.

5. The track laying vehicle of claim 3 wherein the means for transferring a deflectional force from said second sliding rail suspension system to said frame includes a set of bearings attached to said shaft and being spaced apart thereon, said set of bearings also being attached to said frame.

6. A track laying vehicle comprising:
   a) a frame, having a first side and a second side;
   b) a first set of drive wheels, operably connected to the first side of said frame;
   c) a second set of drive wheels, operably connected to the second side of said frame;
   d) a first endless track, being rotatably attached to said first set of drive wheels;
   e) a second endless track, being rotatably attached to said second set of drive wheels, said first endless track and second endless track being oppositely disposed about said frame;
   f) a first sliding rail suspension system, operably installed in said first endless track, said first sliding rail suspension system having an outside portion and an inside portion, such that the inside portion is positioned in close proximity to said frame;
   g) a second sliding rail suspension system, operably installed in said second endless track, said second sliding rail suspension system having an outside portion and an inside portion, such that the inside portion is positioned in close proximity to said frame;

h) a first support arm, having a first end and a second end, said first end of said first support arm being pivotably connected to said first sliding rail suspension system;

i) a second support arm, having a first end and a second end, said first end of said second support arm being pivotably connected to said second sliding rail suspension system;

j) a first shaft, being attached to the second end of said first support arm, and extending inwardly into said frame;

k) a second shaft, being attached to the second end of said second support arm, and extending inwardly into said frame;

l) a first set of bearings, attached to said first shaft and being spaced apart thereon, said first set of bearings also being attached to said frame; and m) a second set of bearings, attached to said second shaft and being spaced apart thereon, said second set of bearings also being attached to said frame.

7. A track laying vehicle comprising:

a) a frame, having a first side and a second side;

b) a first set of drive wheels, operably connected to the first side of said frame;

c) a second set of drive wheels, operably connected to the second side of said frame;

d) a first endless track, being rotatably attached to said first set of drive wheels;

e) a second endless track, being rotatably attached to said second set of drive wheels, said first endless track and second endless track being oppositely disposed about said frame;

f) a first sliding rail suspension system, operably installed in said first endless track, said first sliding rail suspension system having a sliding rail, said first sliding rail suspension system also having an outside portion and an inside portion, such that the inside portion is positioned in close proximity to said frame;

g) a second sliding rail suspension system, operably installed in said second endless track, said second sliding rail suspension system having a sliding rail, said second sliding rail suspension system also having an outside portion and an inside portion, such that the inside portion is positioned in close proximity to said frame;

h) wherein said first sliding rail suspension system includes a forward support member, having a first end being pivotably attached to said sliding rail of said first sliding rail suspension system, and a second end, fixedly attached to a shaft, and further such that said shaft is supported by a pair of bearings being spaced apart on said shaft, and a rear support member, having a first end being pivotably attached to said fixed frame portion of said first sliding rail suspension system, and a second end, fixedly attached to a shaft, and further such that said shaft is supported by a pair of bearings being spaced apart on said shaft; and i) wherein said second sliding rail suspension system includes a forward support member, having a first end being pivotably attached to said sliding rail of said first sliding rail suspension system, and a second end, fixedly attached to a shaft, and further such that said shaft is supported by a pair of bearings being spaced apart on said shaft, and a rear support member, having a first end being pivotably attached to said fixed frame portion of said first sliding rail suspension system, and a second end, fixedly attached to a shaft, and further such that said shaft is supported by a pair of bearings being spaced apart on said shaft.

* * * * *